US009531759B2

(12) United States Patent
Bradley et al.

(10) Patent No.: US 9,531,759 B2
(45) Date of Patent: *Dec. 27, 2016

(54) GENERATING ACCURATE PREEMPTIVE SECURITY DEVICE POLICY TUNING RECOMMENDATIONS

(71) Applicant: INTERNATIONAL BUSINESS MACHINES CORPORATION, Armonk, NY (US)

(72) Inventors: Nicholas W. Bradley, Powder Springs, GA (US); Gary I. Givental, Royal Oak, MI (US); David M. McMillen, Tuxedo Park, NY (US); Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/934,841

(22) Filed: Nov. 6, 2015

(65) Prior Publication Data

US 2016/0065621 A1 Mar. 3, 2016

Related U.S. Application Data

(63) Continuation of application No. 14/219,641, filed on Mar. 19, 2014, now Pat. No. 9,253,204.

(51) Int. Cl.
*G06F 21/56* (2013.01)
*H04L 29/06* (2006.01)
*H04L 29/08* (2006.01)

(52) U.S. Cl.
CPC .......... *H04L 63/20* (2013.01); *H04L 63/0236* (2013.01); *H04L 63/105* (2013.01);
(Continued)

(58) Field of Classification Search
USPC ............................ 726/4, 11, 22, 25; 713/164
See application file for complete search history.

(56) References Cited

U.S. PATENT DOCUMENTS

| 2003/0110396 A1* | 6/2003 | Lewis | H04L 63/0227 726/4 |
| 2005/0015622 A1* | 1/2005 | Williams | H04L 12/2602 726/4 |

(Continued)

FOREIGN PATENT DOCUMENTS

WO 2012128974 9/2012

OTHER PUBLICATIONS

Ramasubramanian, P., et al.; "Intelligent Multi-Agent Based Back-Propogation Neural Network Forecasting Model for Statistical Database Anomaly Prevention System" Proceedings of International Conference on Intelligent Sensing and Information Processing; pp. 108-113; 2004.

(Continued)

*Primary Examiner* — Sayed Beheshti Shirazi
(74) *Attorney, Agent, or Firm* — Schmeiser, Olsen & Watts; William H. Hartwell

(57) ABSTRACT

An approach is provided for determining a likelihood of an attack on a first computer system of a first business. Characteristics of the first business and a second business are determined. The second business has a second computer system currently or recently under attack. The characteristics include respective industries, sizes, geographical locations, types of sensitive data, and security vulnerabilities associated with the first and second businesses or first and second computer systems, an address of traffic through a device in the first computer system, and an address of an entity responsible for the attack on the second computer system. Based on a similarity between the characteristics of the first and second businesses, a likelihood that the entity responsible for the attack on the second computer system will attack the first computer system of the first business is determined.

10 Claims, 6 Drawing Sheets

(52) U.S. Cl.
CPC ...... *H04L 63/1416* (2013.01); *H04L 63/1433* (2013.01); *H04L 63/1441* (2013.01); *H04L 67/10* (2013.01)

(56) References Cited

U.S. PATENT DOCUMENTS

| | | | | |
|---|---|---|---|---|
| 2009/0307777 A1* | 12/2009 | He | ............ | G06F 21/55 726/25 |
| 2010/0319069 A1* | 12/2010 | Granstedt | ............ | H04L 63/0263 726/22 |
| 2012/0185944 A1* | 7/2012 | Abdine | ............ | H04L 63/1433 726/25 |
| 2012/0297475 A1* | 11/2012 | Aaron | ............ | H04L 63/20 726/11 |
| 2013/0247205 A1* | 9/2013 | Schrecker | ............ | G06F 21/577 726/25 |
| 2014/0172495 A1* | 6/2014 | Schneck | ............ | G06Q 10/0635 705/7.28 |
| 2015/0271199 A1 | 9/2015 | Bradley et al. | | |

OTHER PUBLICATIONS

Notice of Allowance (Mail Date Oct. 7, 2015) for U.S. Appl. No. 14/219,641, filed Mar. 19, 2014.

\* cited by examiner

GENERATING ACCURATE PREEMPTIVE SECURITY DEVICE POLICY TUNING RECOMMENDATIONS

This application is a continuation application claiming priority to Ser. No. 14/219,641 filed Mar. 19, 2014.

TECHNICAL FIELD

The present invention relates generally to managing security device policies, and more specifically to automatically determining a likelihood of a future attack on a computer system.

BACKGROUND

It is typically too late to adjust security device policies after an attack occurs on the associated computer system. An adjustment to the security device policies before an attack occurs requires time-consuming labor-intensive research of communications and reports about security threats followed by manual implementation of the adjustment through each security device's management interface.

International Patent Publication No. WO 2012/128974, to applicant Architelos, Inc. and inventor Alexa Raad, teaches a system for predictive modeling in a network security service that includes maintaining and storing threat information, including location information associated with threats.

BRIEF SUMMARY

An embodiment of the present invention is a method, computer system and computer program product for determining a likelihood of an attack on a first computer system of a first business. Characteristics of the first business are determined. The characteristics of the first business include an industry, a size, and a geographical location of the first business, a type of sensitive data managed by the first computer system, a security vulnerability in the first computer system, and an address of a source or a destination of data traffic through a security device in the first computer system. Characteristics of a second business which has a second computer system currently or recently under attack are determined. The characteristics of the second business include an industry, a size, and a geographical location of the second business, a type of sensitive data managed by the second computer system, a security vulnerability in the second computer system, and an address of an entity responsible for the current or recent attack on the second computer system. A similarity between the characteristics of the first and second businesses is determined. Based on the similarity, a likelihood that the entity responsible for the current or recent attack on the second computer system will attack the first computer system of the first business is determined.

Embodiments of the present invention automatically generate accurate policy change recommendations for security devices, including intrusion prevention systems and firewalls, by correlating a security and contextual data about a business with previously collected security and contextual data about a large number of businesses whose computer systems have been attacked.

DETAILED DESCRIPTION

Overview

Embodiments of the present invention determine a correlation between computer system security and contextual data about a business and computer system security and contextual data previously collected about a group of other businesses whose computer systems are being or have been attacked by an entity. The correlation is scored and if the score exceeds a threshold, a security policy change recommendation program automatically generates security policy change recommendation(s) for security devices such as an intrusion prevention system and firewalls included in a computer system of the business as a preemptive measure to prevent the computer system from being attacked by the entity. The security policy is tuned according to the recommendation which results in preventing the computer system from being attacked by the entity.

System for Determining a Likelihood of an Attack on a Computer System

Figure 1:
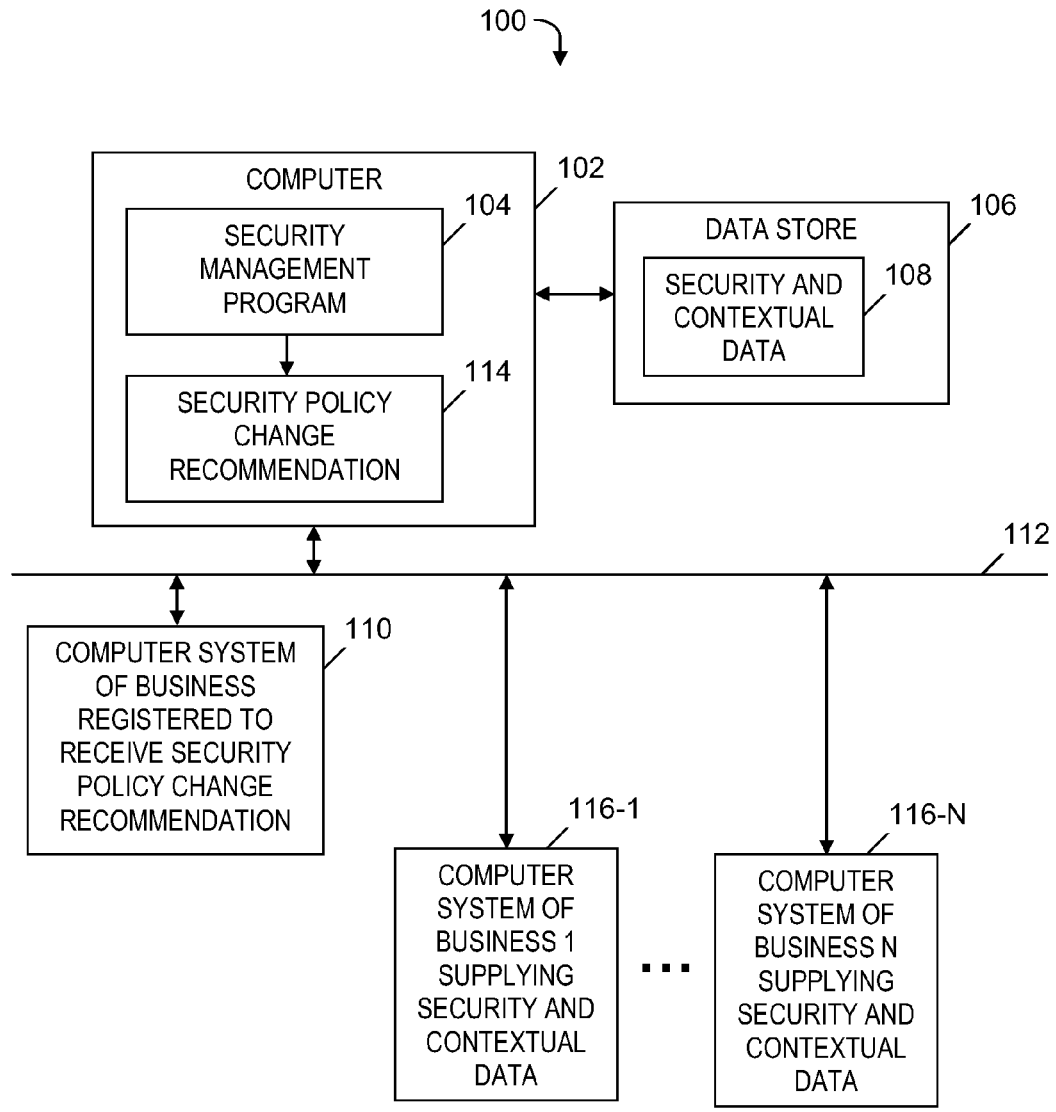
FIG. 1 is a block diagram of a system for determining a likelihood of an attack on a computer system, in accordance with embodiments of the present invention.

FIG. 1 is a block diagram of a system 100 for determining a likelihood of an attack on a computer system, in accordance with embodiments of the present invention. System 100 includes a computer 102, which executes a software-based security management program 104. Computer 102 is coupled to computer data store 106, which includes security and contextual data 108. Security and contextual data 108 includes characteristics of businesses 1 . . . N, where N is an integer greater than one, and where the characteristics include industries, sizes, and geographical locations of the businesses. The characteristics also include types of sensitive data (e.g., credit card numbers, social security numbers, or bank account numbers) managed by computer systems of the businesses, security vulnerabilities identified in the computer systems by network scanners, and Internet Protocol (IP) addresses of entities responsible for current or recent attacks on the computer systems. A recent attack is an attack that has occurred within a predetermined time period that can be entered by a user and/or stored as a configurable value.

Computer 102 is in communication with computer system 110 via a computer network 112 (e.g., the Internet). Computer system 110 is a computer system of a business that is registered to receive a security policy change recommendation 114, which is based on security and contextual data 108.

Computer 102 is in communication with computer systems 116-1 . . . 116-N, which are the computer systems of businesses 1 . . . N, respectively. Computer systems 116-1 . . . 116-N supply data which is sent to computer 102 via network 112 and which is stored as security and contextual data 108 in data store 106.

Internal and external components of computer 102 are further described below relative to FIG. 4. The functionality of components of system 100 is further described below in the discussion relative to FIG. 2 and FIGS. 3A-3C.

Figure 2:
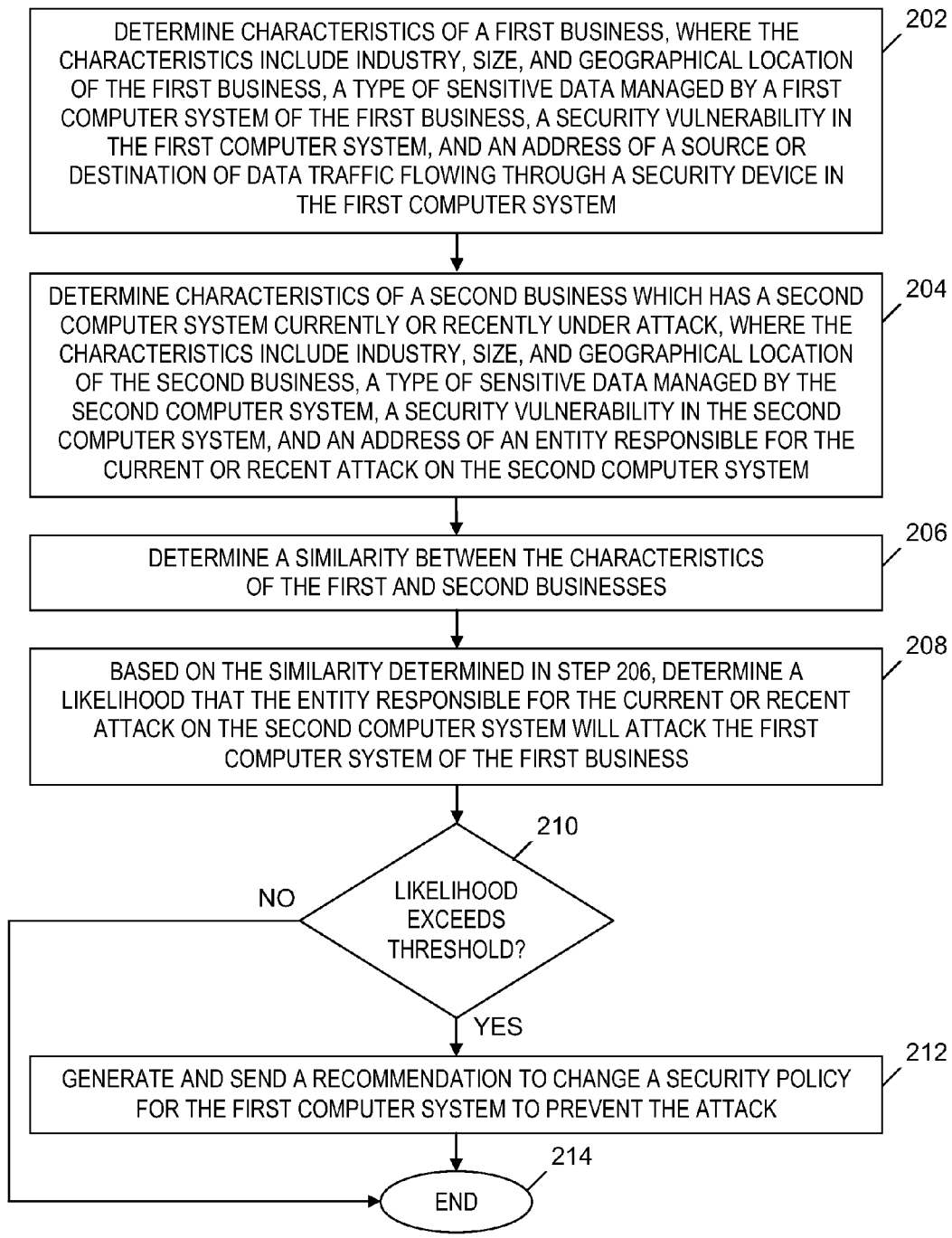
FIG. 2 is a flowchart of a security management program executed in the system of FIG. 1, which generates a security policy change recommendation, in accordance with embodiments of the present invention.

FIG. 2 is a flowchart of security management program 104 (see FIG. 1) executed in the system of FIG. 1, which generates security policy change recommendation 114 (see FIG. 1) in accordance with embodiments of the present invention. In step 202, security management program 104 (see FIG. 1) determines characteristics of a first business that is registered to receive security policy change recommendation 114 (see FIG. 1). The characteristics determined in step 202 include security and contextual data associated with the first business, including: (1) an industry of the first business; (2) a size of the first business; (3) a geographical location of the first business; (4) a type of sensitive data managed by computer system 110 (see FIG. 1), which is utilized by the first business; (5) a security vulnerability of computer system 110 (see FIG. 1), where the vulnerability is identified by a network scanner; and (6) an IP address of a source or a destination of data traffic flowing through a security device (e.g., a firewall, intrusion prevention system (IPS), anti-virus device, or anti-spam device) in computer system 110 (see FIG. 1).

In step 204, security management program 104 (see FIG. 1) determines characteristics of a second business (or multiple other businesses) by retrieving security and contextual data 108 (see FIG. 1) from data store 106 (see FIG. 1), where the second business utilizes computer system 116-1 (see FIG. 1), which is currently or has recently been under attack. The characteristics determined in step 204 include (1) an industry of the second business; (2) a size of the second business; (3) a geographical location of the second business; (4) a type of sensitive data managed by computer system 116-1 (see FIG. 1); (5) a security vulnerability of computer system 116-1 (see FIG. 1), where the vulnerability is identified by a network scanner; and (6) an IP address of an entity who is responsible for the current or recent attack on computer system 116-1 (see FIG. 1).

In step 206, security management program 104 (see FIG. 1) determines a similarity between the characteristics of the first and second businesses determined in step 202 and step 204, respectively. In one embodiment, the similarity determined in step 206 is based on whether (1) the industry of the first business matches the industry of the second business; (2) the size of the first business matches the size of the second business (i.e., the sizes match if the sizes are equal or if the difference between the sizes is within a predetermined tolerance amount); (3) the geographical location of the first business matches the geographical location of the second business; (4) the type of sensitive data managed by computer system 110 (see FIG. 1) of the first business matches the type of sensitive data managed by computer system 116-1 (see FIG. 1) of the second business; (5) the security vulnerability of computer system 110 (see FIG. 1) matches the security vulnerability of computer system 116-1 (see FIG. 1); and (6) the IP address of a source or destination of data traffic through a security device in computer system 110 (see FIG. 1) matches the IP address of the entity responsible for the current or recent attack on computer system 116-1 (see FIG. 1).

In step 208, based on the similarity determined in step 206, security management program 104 (see FIG. 1) determines a likelihood that the entity responsible for the current or recent attack on computer system 116-1 (see FIG. 1) of the second business will attack computer system 110 (see FIG. 1) of the first business. In one embodiment, the likelihood determined in step 206 is a score that is initialized as zero and is incremented by (1) a first predetermined amount if the industry of the first business matches the industry of the second business; (2) a second predetermined amount if the size of the first business matches the size of the second business; (3) a third predetermined amount if the geographical location of the first business matches the geographical location of the second business; (4) a fourth predetermined amount if the type of sensitive data managed by computer system 110 (see FIG. 1) of the first business matches the type of sensitive data managed by computer system 116-1 (see FIG. 1) of the second business; (5) a fifth predetermined amount if the security vulnerability of computer system 110 (see FIG. 1) matches the security vulnerability of computer system 116-1 (see FIG. 1); and (6) a sixth predetermined amount if the IP address of a source or destination of data traffic through security device in computer system 110 (see FIG. 1) matches the IP address of the entity responsible for the current or recent attack on computer system 116-1 (see FIG. 1).

In step 210, security management program 104 (see FIG. 1) determines whether the likelihood determined in step 208 exceeds a predetermined threshold. In one embodiment, step 210 includes security management program 104 (see FIG. 1) determining whether a score determined as the likelihood in step 208 exceeds a predetermined threshold score (e.g., whether the score exceeds 2). Security management program 104 (see FIG. 1) receives the predetermined threshold prior to step 210. If security management program 104 (see FIG. 1) determines in step 210 that the likelihood exceeds the predetermined threshold, then the Yes branch of step 210 is taken and step 212 is performed. In step 212, security management program 104 (see FIG. 1) generates recommendation 114 (see FIG. 1) to change a security policy for computer system 110 (see FIG. 1) to prevent an attack from the IP address of the entity responsible for the current or recent attack on computer system 116-1 (see FIG. 1). In one embodiment, the security policy indicated in recommendation 114 (see FIG. 1) is a policy of a firewall of computer system 110 (see FIG. 1). In another embodiment, the security policy is a policy of an intrusion prevention system (not shown) coupled to computer system 110 (see FIG. 1). Security management program 104 (see FIG. 1) also sends recommendation 114 (see FIG. 1) to computer system 110 (see FIG. 1) in step 212. In response to computer system 110 receiving recommendation 114 (see FIG. 1) sent in step 212, computer system 110 (see FIG. 1) receives and makes the change to the security policy indicated in recommendation 114 (see FIG. 1) and in response to the change, an attack computer system 110 (see FIG. 1) by the entity responsible for the current or recent attack on computer system 116-1 (see FIG. 1) is prevented. After step 212, the process of FIG. 2 ends at step 214.

Returning to step 210, if security management program 104 (see FIG. 1) determines that the likelihood determined in step 208 does not exceed the predetermined threshold, then the No branch of step 210 is taken and the process of FIG. 2 ends at step 214.

In an alternate embodiment, the characteristics determined in step 202 include only the security vulnerability of computer system 110 (see FIG. 1) and the IP address of the source or destination of data traffic flowing through the security device of computer system 110 (see FIG. 1) (i.e., characteristics listed above as (5) and (6) relative to step 202), and the characteristics determined in step 204 include only the security vulnerability of computer system 116-1 (see FIG. 1) and the IP address of the entity responsible for the current or recent attack on computer system 116-1 (see FIG. 1) (i.e., characteristics listed above as (5) and (6)

relative to step 204). In this embodiment, the similarity determined in step 206 and the likelihood determined in step 208 are based on whether the security vulnerabilities match and the whether the IP address of the source or destination of data traffic flowing through the security device of computer system 110 (see FIG. 1) matches the IP address of the entity responsible for the current or recent attack on computer system 116-1 (see FIG. 1).

Alternate Embodiment

In an alternate embodiment of the process of FIG. 2, step 202 is performed as described above. In step 204, security management program 104 (see FIG. 1) determines the aforementioned characteristics of multiple businesses (i.e., the N businesses that have computer systems 116-1 . . . 116-N (see FIG. 1), respectively). The characteristics determined in step 204 include an indication of a subset of computer systems included in computer systems 116-1 . . . 116-N (see FIG. 1), where the computer systems are utilized by target businesses. Target businesses are a subset of the N businesses that are currently or have recently been attacked from a specific IP address. Prior to step 204, computer 102 (see FIG. 1) receives a list of suspicious IP addresses and security management program 104 (see FIG. 1) selects the specific IP address from the list of suspicious IP addresses.

In step 206, security management program 104 (see FIG. 1) determines one or more of six percentages of the target businesses: (1) a first percentage of the target businesses whose industry matches the industry of the aforementioned first business (i.e., the business that utilizes computer system 110 (see FIG. 1)); (2) a second percentage of the target businesses whose size matches the size of the first business; (3) a third percentage of the target businesses whose geographical location matches the geographical location of the first business; (4) a fourth percentage of the target businesses whose computer systems manage a type of sensitive data that manages the type of sensitive data managed by computer system 110 (see FIG. 1) of the first business; (5) a fifth percentage of the target businesses whose computer systems have security vulnerabilities that match the security vulnerability of computer system 110 (see FIG. 1) of the first business; and (6) a sixth percentage of the target businesses whose computer systems have been attacked by an entity from an IP address that matches the IP address that is a source or destination address of traffic flowing through a security device in computer system 110 (see FIG. 1) of the first business.

In step 208, security management program 104 (see FIG. 1) determines a score that indicates the likelihood that the entity responsible for the current or recent attacks on the computer systems of the target businesses will attack computer system 110 (see FIG. 1) of the first business. Security management program 104 (see FIG. 1) initializes the score to zero and increments the score by (1) a first predetermined amount if the aforementioned first percentage of the target businesses exceeds a predetermined threshold percentage (e.g., 50%); (2) a second predetermined amount if the aforementioned second percentage of the target businesses exceeds a predetermined threshold; (3) a third predetermined amount if the aforementioned third percentage of the target businesses exceeds a predetermined threshold; (4) a fourth predetermined amount if the aforementioned fourth percentage of the target businesses exceeds a predetermined threshold; (5) a fifth predetermined amount if the aforementioned fifth percentage of the target businesses exceeds a predetermined threshold; and (6) a sixth predetermined amount if the aforementioned sixth percentage of the target businesses exceeds a predetermined threshold. Steps 210, 212 and 214 are performed as described in the embodiment discussed above.

Instead of ending at step 214, the security management program 104 (see FIG. 1) can select the next IP address in the list of suspicious IP addresses, and repeat the process starting at step 204, until no IP addresses on the list of suspicious IP addresses remain unselected.

In one embodiment, the predetermined amounts that adjust the score determined in step 208 are based on the corresponding percentages determined in step 206 being multiplied by predetermined amounts. For example, if the first percentage of the target businesses whose industry matches the industry of the first business is 72%, then the score is incremented by 72%×1 in step 208. If the first percentage is instead 51%, then the score is incremented by 51%×1 in step 208.

Figure 3A:
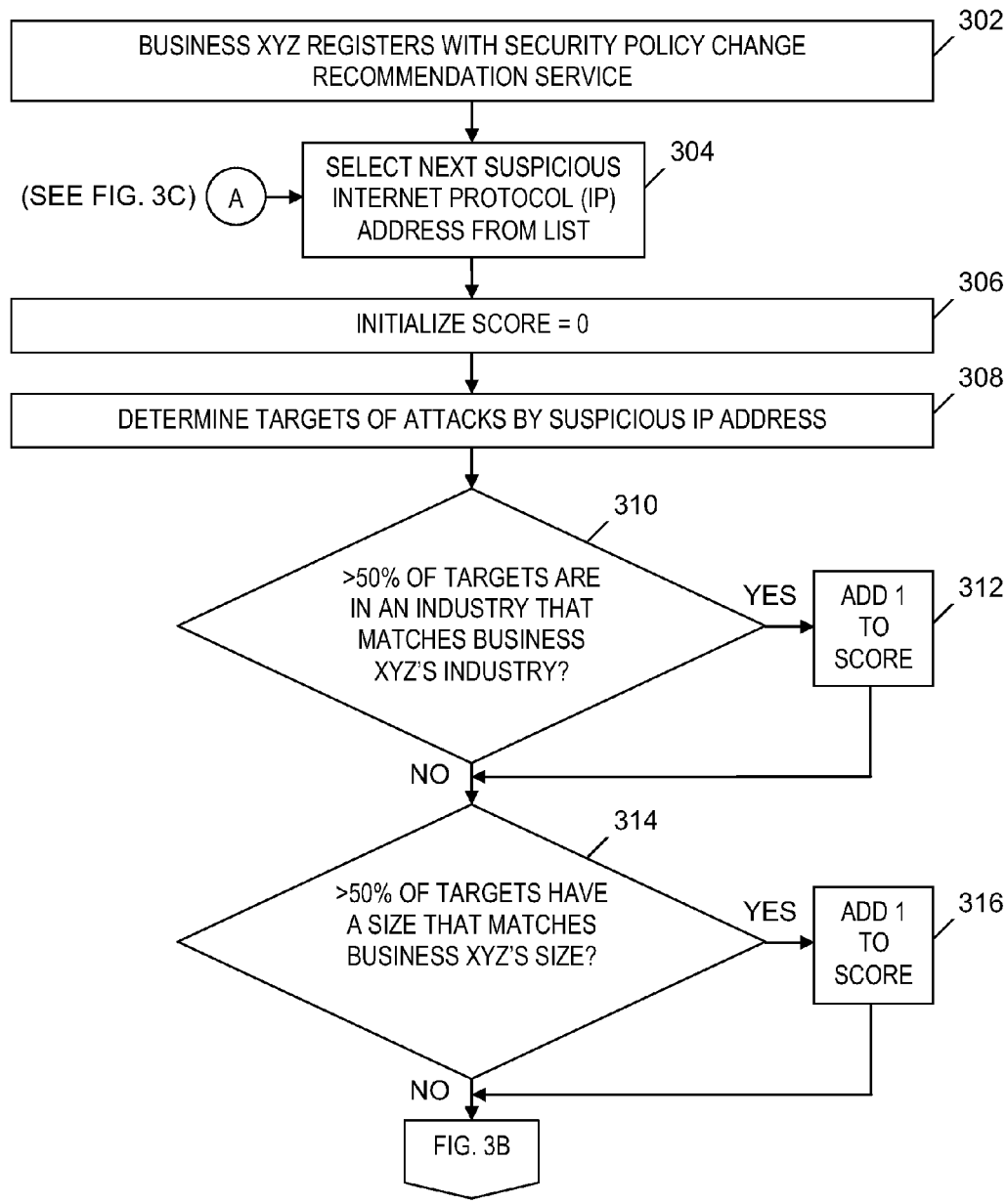
FIGS. 3A-3C is an example of determining a likelihood of an attack on a computer system and generating a security policy change recommendation based on the likelihood of the attack, in accordance with embodiments of the present invention.
Figure 3B:
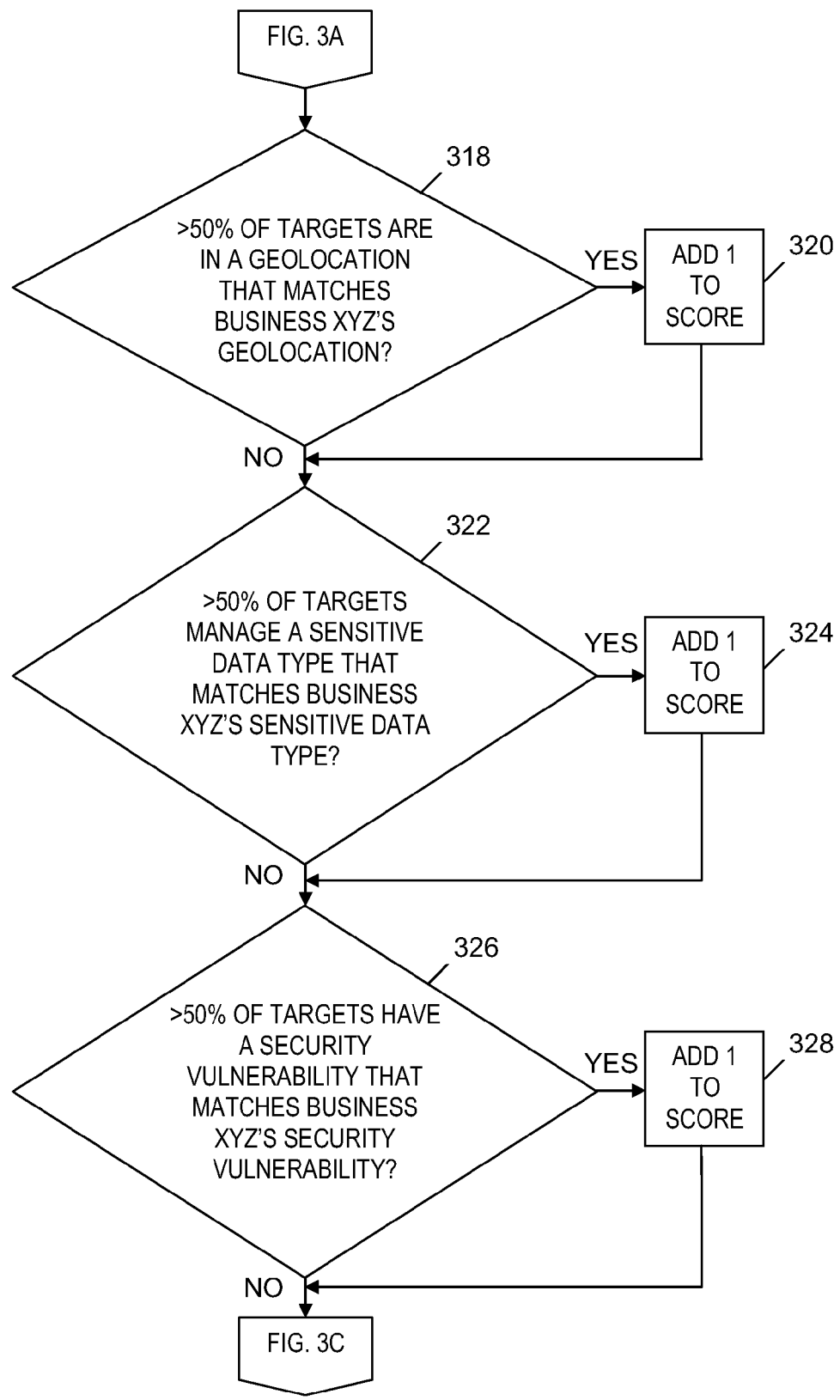
Figure 3C:
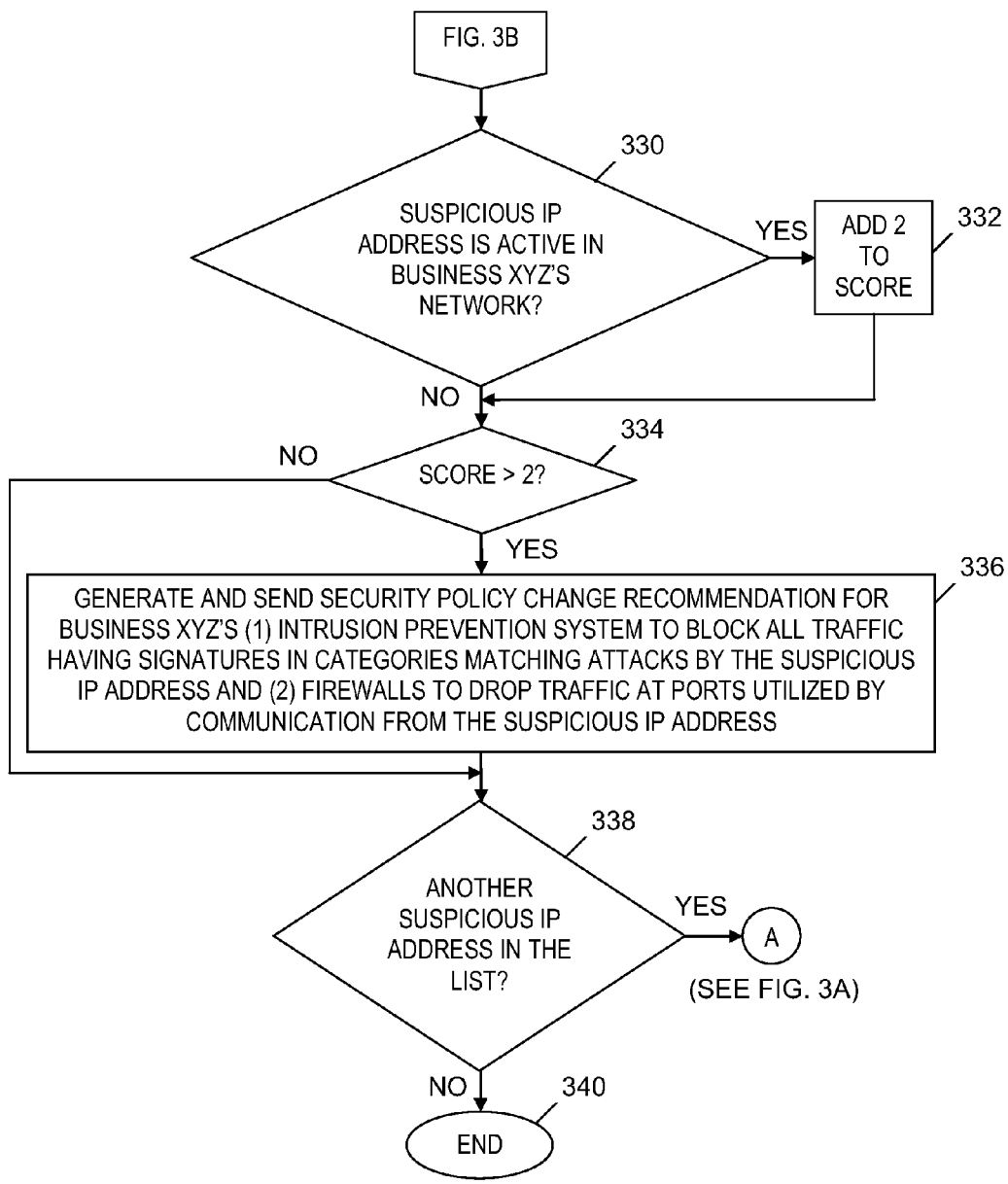

FIGS. 3A-3C is an example of determining a likelihood of an attack on computer system 110 (see FIG. 1) and generating security policy change recommendation 114 (see FIG. 1) based on the likelihood of the attack, in accordance with embodiments of the present invention. In step 302, computer 102 (see FIG. 1) receives a registration of Business XYZ with a security policy change recommendation service provided by security management program 104 (see FIG. 1).

In step 304, security management program 104 (see FIG. 1) selects the first or next IP address from a list of suspicious IP addresses which is stored in data store 106 (see FIG. 1). In step 306, security management program 104 (see FIG. 1) initializes a score to zero. In step 308, security management program 104 (see FIG. 1) retrieves from security and contextual data 108 (see FIG. 1): (1) the businesses that are the target businesses that are being or have recently been attacked by the IP address selected in step 304; (2) the industry of Business XYZ and industries of the target businesses; (3) the size of Business XYZ and the size of the target businesses; (4) the geographical location of Business XYZ and the geographical locations of the target businesses; (5) a type of sensitive data managed by computer system 110 (see FIG. 1) of Business XYZ and types of sensitive data managed by computer systems of the target businesses; (6) a security vulnerability of computer system 110 (see FIG. 1) of Business XYZ and security vulnerabilities of the computer systems of the target businesses; and (7) IP addresses that are active as the source or destination of data traffic in a network in computer system 110 (see FIG. 1) of Business XYZ.

In step 310, security management program 104 (see FIG. 1) determines whether more than 50% of the target businesses are in an industry that matches the industry of Business XYZ. If more than 50% of the target businesses are in an industry that matches the industry of Business XYZ, then the Yes branch of step 310 is followed and step 312 is performed. In step 312, security management program 104 (see FIG. 1) adds one to the score. Step 314 follows step 312.

Returning to step 310, if not more than 50% of the target businesses are in an industry that matches the industry of Business XYZ, then the No branch of step 310 is followed and step 314 is performed.

In step 314, security management program 104 (see FIG. 1) determines whether more than 50% of the target businesses have a size that matches the size of Business XYZ. If more than 50% of the target businesses have a size that matches the size of Business XYZ, then the Yes branch of step 314 is followed and step 316 is performed. In step 316, security management program 104 (see FIG. 1) adds one to the score. Step 318 in FIG. 3B follows step 316.

Returning to step 314, if not more than 50% of the target businesses have a size that matches the size of Business XYZ, then the No branch of step 314 is followed and step 318 in FIG. 3B is performed.

In step 318, security management program 104 (see FIG. 1) determines whether more than 50% of the target businesses are in a geographical location that matches the geographical location of Business XYZ. If more than 50% of the target businesses are in a geographical location that matches the geographical location of Business XYZ, then the Yes branch of step 318 is followed and step 320 is performed. In step 320, security management program 104 (see FIG. 1) adds one to the score. Step 322 follows step 320.

Returning to step 318, if not more than 50% of the target businesses are in a geographical location that matches the geographical location of Business XYZ, then the No branch of step 318 is followed and step 322 is performed.

In step 322, security management program 104 (see FIG. 1) determines whether more than 50% of the computer systems of the target businesses manage a type of sensitive data that matches a type of sensitive data managed by computer system 110 (see FIG. 1) of Business XYZ. If more than 50% of the computer systems of the target businesses manage a type of sensitive data that matches the type of sensitive data managed by computer system 110 (see FIG. 1) of Business XYZ, then the Yes branch of step 322 is followed and step 324 is performed. In step 324, security management program 104 (see FIG. 1) adds one to the score. Step 326 follows step 324.

Returning to step 322, if not more than 50% of the computer systems of the target businesses manage a type of sensitive data that matches the type of sensitive data managed by computer system 110 (see FIG. 1) of Business XYZ, then the No branch of step 322 is followed and step 326 is performed.

In step 326, security management program 104 (see FIG. 1) determines whether more than 50% of the computer systems of the target businesses have a security vulnerability that matches a security vulnerability of computer system 110 (see FIG. 1) of Business XYZ. If more than 50% of the computer systems of the target businesses have a security vulnerability that matches the security vulnerability of computer system 110 (see FIG. 1) of Business XYZ, then the Yes branch of step 326 is followed and step 328 is performed. In step 328, security management program 104 (see FIG. 1) adds one to the score. Step 330 in FIG. 3C follows step 328.

Returning to step 326, if not more than 50% of the computer systems of the target businesses have a security vulnerability that matches the security vulnerability of computer system 110 (see FIG. 1) of Business XYZ, then the No branch of step 326 is followed and step 330 in FIG. 3C is performed.

In step 330, security management program 104 (see FIG. 1) determines whether the suspicious IP address selected in step 304 (see FIG. 3A) is active as a source or destination of data traffic flowing in a network included in computer system 110 (see FIG. 1) of Business XYZ (i.e., determines whether the suspicious IP address is active in the network of Business XYZ). If the suspicious IP address is active in the network of Business XYZ, then the Yes branch of step 330 is followed and step 332 is performed. In step 332, security management program 104 (see FIG. 1) adds two to the score. Step 334 follows step 332.

Returning to step 330, if the suspicious IP address is not active in the network of Business XYZ, then the No branch of step 330 is followed and step 334 is performed.

In step 334, security management program 104 (see FIG. 1) determines whether the score is greater than two. If the score is greater than two, then the Yes branch of step 334 is followed and step 336 is performed. In step 336, security management program 104 (see FIG. 1) generates security policy change recommendation 114 (see FIG. 1) which recommends that an intrusion prevention system (not shown) of Business XYZ block all data traffic having signatures in categories that match attacks by the suspicious IP address. The security policy change recommendation 114 (see FIG. 1) generated in step 336 also recommends that firewalls of Business XYZ drop traffic at ports utilized by communication from the suspicious IP address. Step 338 follows step 336.

Returning to step 334, if the score is not greater than two, then the No branch of step 334 is followed and step 338 is performed.

In step 338, security management program 104 (see FIG. 1) determines whether there is another suspicious IP address in the list of suspicious IP addresses that has not been selected in step 304 (see FIG. 3A). If there is another suspicious IP address to be selected, then the Yes branch of step 338 is followed and the process loops back to step 304 in FIG. 3A to select the next suspicious IP address in the list of suspicious IP addresses; otherwise the No branch of step 338 is followed and step 340 is performed. The process of FIGS. 3A-3C ends at step 340.

Computer System

Figure 4:
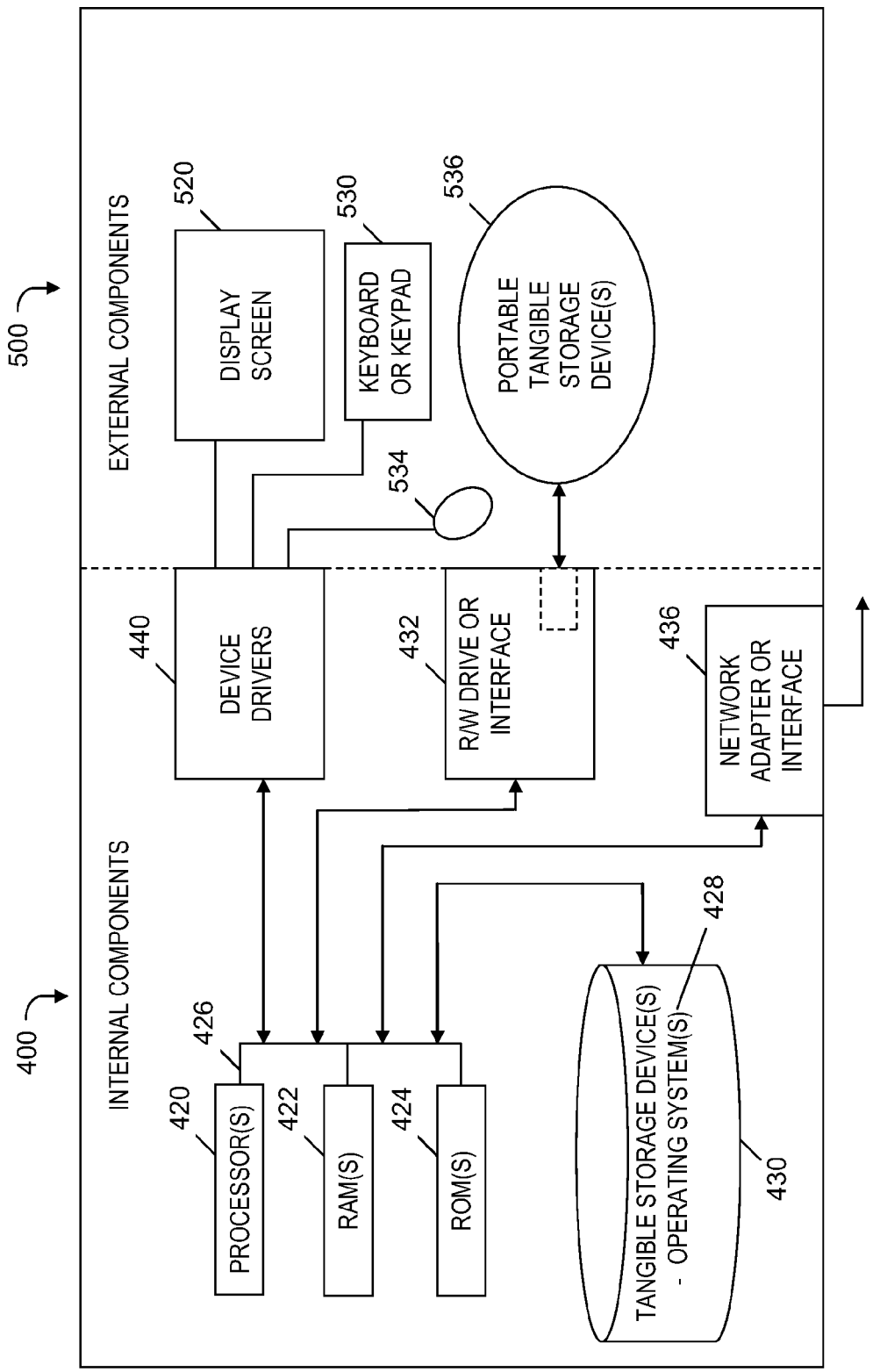
FIG. 4 is a block diagram of components of a computer included in the system of FIG. 1 for determining a likelihood of an attack on a computer system, in accordance with embodiments of the present invention.

FIG. 4 is a block diagram of components of a computer included in the system of FIG. 1 for determining a likelihood of an attack on a computer system, in accordance with embodiments of the present invention. Computer 102 (see FIG. 1) includes sets of internal components 400 and external components 500 illustrated in FIG. 4. The set of internal components 400 includes one or more processors 420, one or more computer-readable random access memories (RAMs) 422 and one or more computer-readable read-only memories (ROMs) 424 on one or more buses 426, one or more operating systems 428 and one or more computer-readable storage devices 430. The operating system(s) 428 and program instructions 104 (for computer 102 in FIG. 1) are stored on one or more of the respective computer-readable storage devices 430 for execution by one or more of the respective processors 420 via one or more of the respective RAMs 422 (which typically include cache memory). In the illustrated embodiment, each of the computer-readable storage devices 430 is a magnetic disk storage device of an internal hard drive. Alternatively, each of the computer-readable storage devices 430 is a semiconductor storage device such as ROM 424, erasable programmable read-only memory (EPROM), flash memory or any other computer-readable storage device that can store but does not transmit a computer program and digital information.

The set of internal components 400 also includes a read/write (R/W) drive or interface 432 to read from and write to one or more portable tangible computer-readable storage devices 536 that can store but do not transmit a computer program, such as a CD-ROM, DVD, memory stick, magnetic tape, magnetic disk, optical disk or semiconductor storage device. The program instructions 104 (for computer 102 in FIG. 1) can be stored on one or more of the respective portable tangible computer-readable storage devices 536, read via the respective R/W drive or interface 432 and loaded into the respective hard drive or semiconductor storage device 430. The terms "computer-readable storage device" and "computer-readable storage devices" do not mean signal propagation media such as copper cables, optical fibers and wireless transmission media.

The set of internal components 400 also includes a network adapter or interface 436 such as a transmission control protocol/Internet protocol (TCP/IP) adapter card or wireless communication adapter (such as a 4G wireless communication adapter using orthogonal frequency-division multiple access (OFDMA) technology). The program 104 (for computer 102 in FIG. 1) can be downloaded to computer 102 (see FIG. 1) from an external computer or external computer-readable storage device via a network (for example, the Internet, a local area network or other, wide area network or wireless network) and network adapter or interface 436. From the network adapter or interface 436, the program 104 (see FIG. 1) is loaded into the respective hard drive or semiconductor storage device 430. The network may comprise copper wires, optical fibers, wireless transmission, routers, firewalls, switches, gateway computers and/or edge servers.

The set of external components 500 includes a display screen 520, a keyboard or keypad 530, and a computer mouse or touchpad 534. The set of internal components 400 also includes device drivers 440 to interface to display screen 520 for imaging, to keyboard or keypad 530, to computer mouse or touchpad 534, and/or to the display screen for pressure sensing of alphanumeric character entry and user selections. The device drivers 440, R/W drive or interface 432 and network adapter or interface 436 comprise hardware and software (stored in storage device 430 and/or ROM 424.

The program 104 (see FIG. 1) can be written in various programming languages (such as C++) including low-level, high-level, object-oriented or non-object-oriented languages. Alternatively, the functions of program 104 (see FIG. 1) can be implemented in whole or in part by computer circuits and other hardware (not shown).

Based on the foregoing, a computer system, method and program product have been disclosed for determining a likelihood of an attack on a first computer system of a first business. However, numerous modifications and substitutions can be made without deviating from the scope of the present invention. Therefore, the present invention has been disclosed by way of example and not limitation.

The invention claimed is:

1. A method of determining a likelihood of an attack on a first computer system of a first business, the method comprising the steps of:
  determining, by a hardware processor of a computer, a plurality of characteristics of the first business, the characteristics including an industry, a size, and a geographical location of the first business, a type of sensitive data managed by the first computer system, a security vulnerability in the first computer system, and an address of a source or a destination of data traffic through a security device in the first computer system;
  selecting, by the computer, an Internet Protocol (IP) address from a list of suspicious IP addresses, the selected IP address being an address of one of a plurality of entities responsible for current or recent attacks on computer systems of respective businesses included in a plurality of businesses other than the first business;
  determining, by the computer, target businesses within the plurality of businesses as businesses having respective target computer systems, each target computer system currently experiencing or having recently experienced an attack by the one entity whose IP address was selected;
  determining, by the computer, characteristics of the target businesses, the characteristics of the target businesses including respective industries, sizes, and geographical locations of the target businesses, respective types of sensitive data managed by the target computer systems, and respective security vulnerabilities in the target computer systems;
  determining, by the computer, a plurality of percentages of the target businesses, the percentages being associated with respective characteristics of the target businesses including the industries, sizes, and geographical locations of the target businesses, the types of sensitive data managed by the target computer systems, and the security vulnerabilities in the target computer systems, each percentage indicating a percentage of the target businesses whose associated characteristic matches a corresponding characteristic included in the plurality of characteristics of the first business, and the percentages associated with respective threshold amounts;
  determining, by the computer, whether each of the plurality of percentages exceeds the associated threshold amount, and incrementing, by the computer, a score by a predetermined amount for each percentage in the plurality of percentages that is determined to exceed the associated threshold amount, the score having been initialized to zero prior to being incremented;
  determining, by the computer, whether the selected IP address matches the address of the source or destination of data traffic through the security device in the first computer system, and incrementing the score by twice the predetermined amount if the selected IP address is determined to match the address of the source or destination of data traffic through the security device in the first computer system;
  determining, by the computer, whether the score exceeds twice the predetermined amount which indicates a likelihood that the one entity whose IP address was selected will attack the first computer system of the first business, and if the score exceeds twice the predetermined amount, generating, by the computer, a recommendation to change a security policy for the first computer system of the first business; and
  subsequent to the step of determining whether the score exceeds twice the predetermined amount, selecting, by the computer, a next IP address from the list of suspicious IP addresses and repeating, by the computer, steps in the method that had been performed after the step of selecting the IP address and prior to the step of selecting the next IP address until no IP address in the list of suspicious IP addresses remains unselected.

2. The method of claim 1, wherein the step of generating the recommendation results in a prevention of an attack on the first computer system by the one entity whose IP address was selected.

3. The method of claim 1, further comprising the steps of:
  determining, by the computer, that the score exceeds twice the predetermined amount; and
  based on the score exceeding twice the predetermined amount, generating, by the computer, a recommendation for an intrusion prevention system in the first computer system to block all traffic having signatures that match attacks by the selected IP address and a recommendation for a firewall in the first computer system to drop traffic at ports utilized by communication from the selected IP address.

4. The method of claim 1, further comprising the step of: providing at least one support service for at least one of creating, integrating, hosting, maintaining, and deploying computer-readable program code in the computer, the program code being executed by the hardware processor of the computer to implement the steps of determining the plurality of characteristics of the first business, selecting the IP address, determining the target businesses, determining the characteristics of the target businesses, determining the plurality of percentages, determining whether each of the plurality of percentages exceeds the associated threshold amount, incrementing the score by the predetermined amount, determining whether the selected IP address matches the address of the source or destination of data traffic through the security device in the first computer system, incrementing the score by twice the predetermined amount, determining whether the score exceeds twice the predetermined amount, generating the recommendation, selecting the next IP address, and repeating the steps.

5. A computer program product for determining a likelihood of an attack on a first computer system of a first business, the computer program product comprising:
one or more hardware computer-readable storage devices and program instructions stored on the one or more storage devices, the program instructions executing by a hardware processor and the program instructions comprising:
program instructions to determine, by the hardware processor, a plurality of characteristics of the first business, the characteristics including an industry, a size, and a geographical location of the first business, a type of sensitive data managed by the first computer system, a security vulnerability in the first computer system, and an address of a source or a destination of data traffic through a security device in the first computer system;
program instructions to select, by the hardware processor, an Internet Protocol (IP) address from a list of suspicious IP addresses, the selected IP address being an address of one of a plurality of entities responsible for current or recent attacks on computer systems of respective businesses included in a plurality of businesses other than the first business;
program instructions to determine, by the hardware processor, target businesses within the plurality of businesses as businesses having respective target computer systems, each target computer system currently experiencing or having recently experienced an attack by the one entity whose IP address was selected;
program instructions to determine, by the hardware processor, characteristics of the target businesses, the characteristics of the target businesses including respective industries, sizes, and geographical locations of the target businesses, respective types of sensitive data managed by the target computer systems, and respective security vulnerabilities in the target computer systems;
program instructions to determine, by the hardware processor, a plurality of percentages of the target businesses, the percentages being associated with respective characteristics of the target businesses including the industries, sizes, and geographical locations of the target businesses, the types of sensitive data managed by the target computer systems, and the security vulnerabilities in the target computer systems, each percentage indicating a percentage of the target businesses whose associated characteristic matches a corresponding characteristic included in the plurality of characteristics of the first business, and the percentages associated with respective threshold amounts;
program instructions to determine, by the hardware processor, whether each of the plurality of percentages exceeds the associated threshold amount, and increment, by the hardware processor, a score by a predetermined amount for each percentage in the plurality of percentages that is determined to exceed the associated threshold amount, the score having been initialized to zero prior to being incremented;
program instructions to determine, by the hardware processor, whether the selected IP address matches the address of the source or destination of data traffic through the security device in the first computer system, and increment, by the hardware processor, the score by twice the predetermined amount if the selected IP address is determined to match the address of the source or destination of data traffic through the security device in the first computer system;
program instructions to determine, by the hardware processor, whether the score exceeds twice the predetermined amount which indicates a likelihood that the one entity whose IP address was selected will attack the first computer system of the first business, and generate, by the hardware processor, a recommendation to change a security policy for the first computer system of the first business if the score exceeds twice the predetermined amount; and
program instructions to select, by the hardware processor and subsequent to determining whether the score exceeds twice the predetermined amount by an execution of the program instructions to determine whether the score exceeds twice the predetermined amount, a next IP address from the list of suspicious IP addresses and repeat, by the hardware processor, steps that had been performed after selecting the IP address by an execution of the program instructions to select the IP address and prior to selecting the next IP address by an execution of the program instructions to select the next IP address, until no IP address in the list of suspicious IP addresses remains unselected.

6. The computer program product of claim 5, wherein the program instructions
to generate the recommendation, when executed, results in a prevention of an attack on the first computer system by the one entity whose IP address was selected by an execution of the program instructions to select the IP address.

7. The computer program product of claim 5, further comprising:
program instructions, stored on the one or more storage devices, to determine by the hardware processor, that the score exceeds twice the predetermined amount; and
program instructions, stored on the one or more storage devices, to generate, by the hardware processor and based on the score exceeding twice the predetermined amount, a recommendation for an intrusion prevention system in the first computer system to block all traffic having signatures that match attacks by the IP address and a recommendation for a firewall in the first computer system to drop traffic at ports utilized by communication from the IP address.

8. A computer system for determining a likelihood of an attack on a first computer system of a first business, the computer system comprising:
one or more hardware processors, one or more computer-readable memories, one or more computer-readable storage devices, and program instructions stored on the one or more storage devices for execution by the one or more hardware processors via the one or more memories, the program instructions comprising:
first program instructions to determine, by the computer system, a plurality of characteristics of the first business, the characteristics including an industry, a size, and a geographical location of the first business, a type of sensitive data managed by the first computer system, a security vulnerability in the first computer system, and an address of a source or a destination of data traffic through a security device in the first computer system;
second program instructions to select, by the computer system, an Internet Protocol (IP) address from a list of suspicious IP addresses, the selected IP address being an address of one of a plurality of entities responsible for current or recent attacks on computer systems of respective businesses included in a plurality of businesses other than the first business;
third program instructions to determine, by the computer system, target businesses within the plurality of businesses as businesses having respective target computer systems, each target computer system currently experiencing or having recently experienced an attack by the one entity whose IP address was selected;
fourth program instructions to determine, by the computer system, characteristics of the target businesses, the characteristics of the target businesses including respective industries, sizes, and geographical locations of the target businesses, respective types of sensitive data managed by the target businesses, and respective security vulnerabilities in the target computer systems;
fifth program instructions to determine, by the computer system, a plurality of percentages of the target businesses, the percentages being associated with respective characteristics of the target businesses including the industries, sizes, and geographical locations of the target businesses, the types of sensitive data managed by the target computer systems, and the security vulnerabilities in the target computer systems, each percentage indicating a percentage of the target businesses whose associated characteristic matches a corresponding characteristic included in the plurality of characteristics of the first business, and the percentages associated with respective threshold amounts;
sixth program instructions to determine, by the computer system, whether each of the plurality of percentages exceeds the associated threshold amount, and increment, by the computer system, a score by a predetermined amount for each percentage in the plurality of percentages that is determined to exceed the associated threshold amount, the score having been initialized to zero prior to being incremented;
seventh program instructions to determine, by the computer system, whether the selected IP address matches the address of the source or destination of data traffic through the security device in the first computer system, and increment, by the computer system, the score by twice the predetermined amount if the selected IP address is determined to match the address of the source or destination of data traffic through the security device in the first computer system;
eighth program instructions to determine, by the computer system, whether the score exceeds twice the predetermined amount which indicates a likelihood that the one entity whose IP address was selected will attack the first computer system of the first business, and generate, by the computer system, a recommendation to change a security policy for the first computer system of the first business if the score exceeds twice the predetermined amount;
ninth program instructions to select, by the computer system and subsequent to determining whether the score exceeds twice the predetermined amount by an execution of the eighth program instructions to determine whether the score exceeds twice the predetermined amount, a next IP address from the list of suspicious IP addresses; and
tenth program instructions to repeat, by the computer system, steps that had been performed after selecting the IP address by an execution of the second program instructions to select the IP address and prior to selecting the next IP address by an execution of the ninth program instructions to select the next IP address, until no IP address in the list of suspicious IP addresses remains unselected.

9. The computer system of claim 8, wherein the eighth program instructions to
generate the recommendation, when executed, results in a prevention of an attack on the first computer system by the one entity whose IP address was selected by an execution of the second program instructions.

10. The computer system of claim 8, further comprising:
eleventh program instructions, stored on the one or more storage devices for execution by the one or more processors via the one or more memories, to determine, by the computer system, that the score exceeds twice the predetermined amount; and
twelfth program instructions, stored on the one or more storage devices for execution by the one or more processors via the one or more memories, to generate, by the computer system and based on the score exceeding twice the predetermined amount, a recommendation for an intrusion prevention system in the first computer system to block all traffic having signatures that match attacks by the IP address and a recommendation for a firewall in the first computer system to drop traffic at ports utilized by communication from the IP address.

* * * * *